(12) United States Patent
Pham

(10) Patent No.: US 7,663,614 B2
(45) Date of Patent: Feb. 16, 2010

(54) METHOD FOR STORING AND COMPARING COMPUTER GENERATED LINES

(75) Inventor: Nghia Van Pham, Poulsbo, WA (US)

(73) Assignee: Jeff Maynard, Highland Village, TX (US)

( * ) Notice: Subject to any disclaimer, the term of this patent is extended or adjusted under 35 U.S.C. 154(b) by 580 days.

(21) Appl. No.: 10/957,581

(22) Filed: Oct. 5, 2004

(65) Prior Publication Data

US 2006/0071906 A1    Apr. 6, 2006

(51) Int. Cl.
*G09G 5/00* (2006.01)
(52) U.S. Cl. ............ 345/204; 345/156; 345/630
(58) Field of Classification Search ......... 345/166, 345/173, 158, 163, 156, 179, 443, 204, 87, 345/694, 72, 88, 630, 589, 903, 467, 468; 351/246; 715/763; 710/72; 700/98; 358/463, 358/3.23; 702/150
See application file for complete search history.

(56) References Cited

U.S. PATENT DOCUMENTS

| | | | | |
|---|---|---|---|---|
| 3,609,667 A | * | 9/1971 | Messer ................. 710/72 |
| 4,364,035 A | * | 12/1982 | Kirsch ................. 345/166 |
| 5,020,411 A | * | 6/1991 | Rowan ................. 89/1.11 |
| 5,175,103 A | * | 12/1992 | Lee et al. ............. 435/455 |
| 5,194,969 A | * | 3/1993 | DiFrancesco ......... 358/463 |
| 5,288,993 A | * | 2/1994 | Bidiville et al. ...... 250/221 |
| 5,489,920 A | * | 2/1996 | Kaasila ................ 345/443 |
| 5,489,991 A | * | 2/1996 | McMurray ........... 358/3.23 |
| 5,801,681 A | * | 9/1998 | Sayag ................. 345/157 |
| 6,883,143 B2 | * | 4/2005 | Driskell .............. 715/763 |
| 6,933,930 B2 | * | 8/2005 | Devige et al. ........ 345/173 |
| 7,013,191 B2 | * | 3/2006 | Rubbert et al. ....... 700/98 |
| 7,427,984 B2 | * | 9/2008 | Smirnov et al. ...... 345/179 |
| 2003/0003463 A1 | * | 1/2003 | Rothberg et al. ..... 435/6 |
| 2005/0021282 A1 | * | 1/2005 | Sammut et al. ....... 702/150 |
| 2005/0057723 A1 | * | 3/2005 | Wakil et al. .......... 351/246 |

* cited by examiner

*Primary Examiner*—Prabodh Dharia
(74) *Attorney, Agent, or Firm*—Wilson Daniel Swayze, Jr.

(57) ABSTRACT

A method is provided for creating a quadrant array by using two consecutive points in an array of x, y coordinate values generated by movements of a computer mouse or a digitizer tablet. The quadrant array is then saved in computer storage for later verification with a sample quadrant array by using a comparison function.

11 Claims, 4 Drawing Sheets

METHOD FOR STORING AND COMPARING COMPUTER GENERATED LINES

CROSS-REFERENCE TO RELATED APPLICATIONS

Not Applicable.

STATEMENT REGARDING FEDERALLY SPONSORED RESEARCH AND DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates generally to storing collected data points from any computer pointing device, such as a mouse or a digitizer tablet, in a specific format, and more specifically, the comparison of two continuous lines generated by a mouse or a digitizer tablet.

The process of visually comparing two continuous lines for equality is well-established. For example, a person is asked to write a continuous line on one sheet of paper and then is asked to write the same continuous line on a second sheet of paper. By visually comparing the two continuous lines, it can be concluded either the two lines are similar or not similar. The visual comparison is time consuming and can result in comparison errors due to human factors, such as vision problems. The two continuous lines can be electronically generated and compared using an automated computer based verification system. An automated computer based verification system requires a computer mouse or a digitizer tablet to collect data points.

A computer mouse and a digitizer tablet are known for data input applications. Typically, a mouse or a digitizer tablet is used for capturing primarily spatial and sequential information. When a mouse is moved or something is written on a digitizer tablet, the output is a parametric representation of the movement; that is, the writing is represented as a series of x, y coordinate values as a function of time. This feature may be applied to other gathering functions.

The accuracy of an automated computer based verification system relies on the mathematical algorithms and methods of comparing two continuous lines. Today, there are many companies who have developed their own automated computer based verification system, but these systems make mistakes in recognizing the differences between two continuous lines.

What is needed is a method for collecting the parametric representation of the movement of the computer mouse or digitizer tablet at certain time intervals and using the collected parametric representation to generate certain differentiating factors to provide a highly reliable technique for comparing two continuous lines.

BRIEF SUMMARY OF THE INVENTION

According to the invention, a method is provided for collecting data generated by a computer mouse or a digitizer tablet at certain time intervals, representing a continuous line, and using the collected data to generate a quadrant array. A quadrant array is an array of integers. In a specific embodiment, the quadrant array is saved in computer storage.

In a typical application, the verification process would be performed by first collecting data generated by a computer mouse or a digitizer tablet at certain time intervals, representing a continuous line, and to generate a quadrant array using the collected data. Next, the quadrant array is compared to a stored reference quadrant array. Reference quadrant array can be stored in computer storage.

DETAILED DESCRIPTIONS OF THE INVENTION

Figure 1:
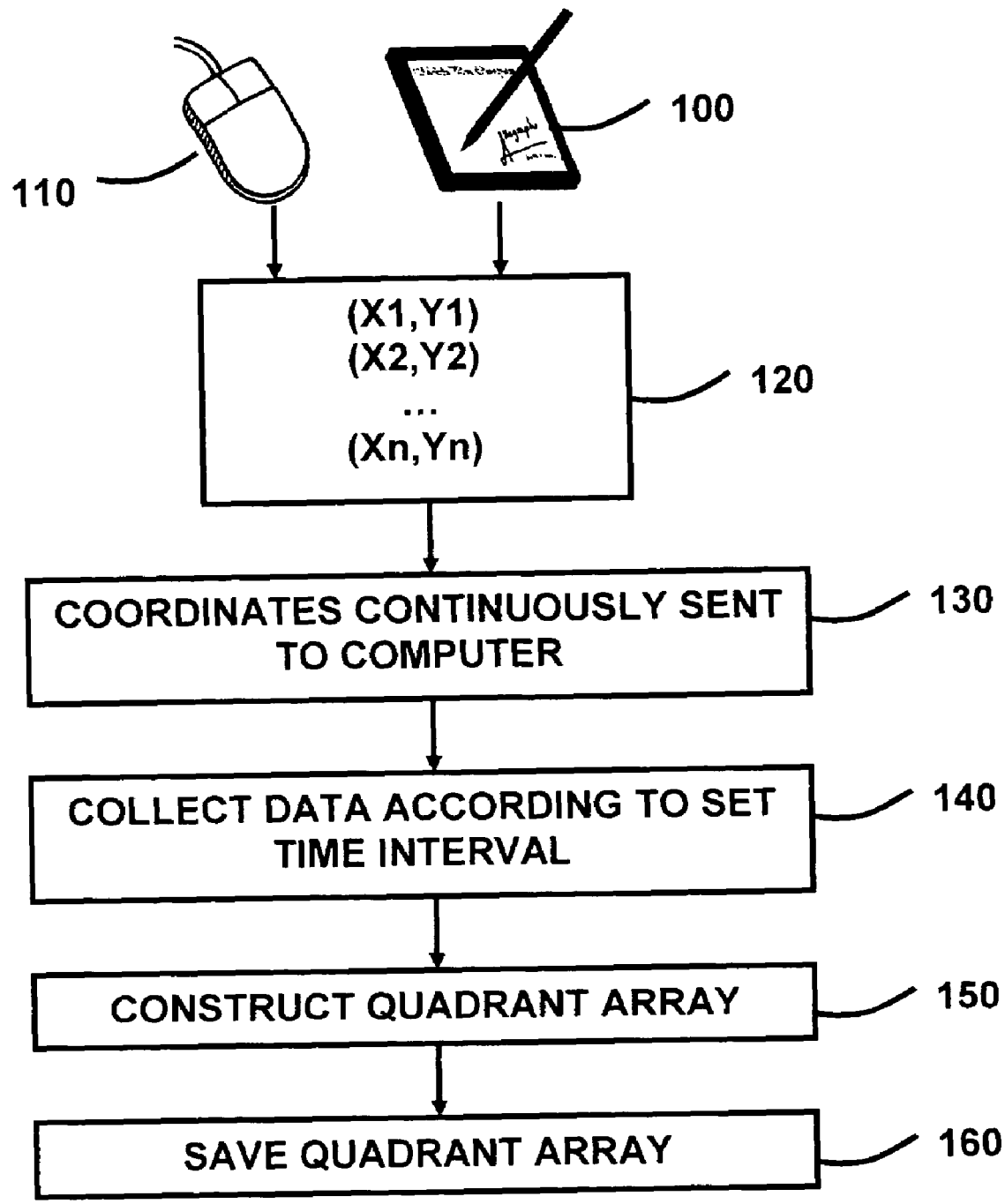
FIG. 1 is a flow chart of the general data collection, the creation of a quadrant array, and the storing of the quadrant array according to the invention.

The flow chart of FIG. 1 illustrates the method for collecting and saving data generated by the computer mouse 110 and the digitizer tablet 100. Data is input by the movement of the computer mouse or a scribing instrument to the surface of a position-sensitive digitizer tablet which correlates position with time by means of a sampling technique 120. The movement of the computer mouse generates a series of x, y coordinate values as a function of time (step 130). The tablet presents the resultant scribing a series of x, y coordinate values as a function of time (step 130).

At step 140, the invention collects data transmitted by a computer mouse or a digitizer tablet according to a set time interval defined by the programmer. A computer mouse or a digitizer tablet continuously transmits x, y coordinate values to the receiving computer. For example, a typical computer mouse sends an x, y coordinate value every 0.01 second. A typical digitizer tablet samples the position of the pen every 0.01 second. The invention sets a sampling interval of 0.10 seconds. By collecting a sampling interval of 0.10 seconds, the invention can accurately verify if two lines are similar.

At step 150, the invention constructs a quadrant array. In general, a computer program function can be used to describe the process which is applied to each data element of every data point; namely, a computer program function for generating a quadrant array using the collected data (step 140). In the most general form, this function can be expressed using pseudo code:

```
for i = 0 to N − 1
    xVal = x[ i + 1 ] − x[ i ]
    yVal = y[ i + 1 ] − y[ i ]
    QARRAY[ i ] = QUAD_1
    if xVal > 0 && yVal > 0
        then QARRAY[ i ] = QUAD_1
    if xVal < 0 && yVal > 0
        then QARRAY[ i ] = QUAD_2
    if xVal < 0 && yVal < 0
        then QARRAY[ i ] = QUAD_3
    if xVal > 0 && yVal < 0
        then QARRAY[ i ] = QUAD_4
``` where
  x[i] and y[i] over the range i=0 to i=N−1 is the discrete representation of a line,
  QARRAY[i] over the range i=0 to i=N−2 is the quadrant array,
  QUAD_1, QUAD_2, QUAD_3, and QUAD_4 are integers,
  xVal and yVal are integers, and
  N is the number of points.

After applying the process for constructing a quadrant array (step 150), the quadrant array is saved in computer storage (step 160) for later comparison.

Figure 2:
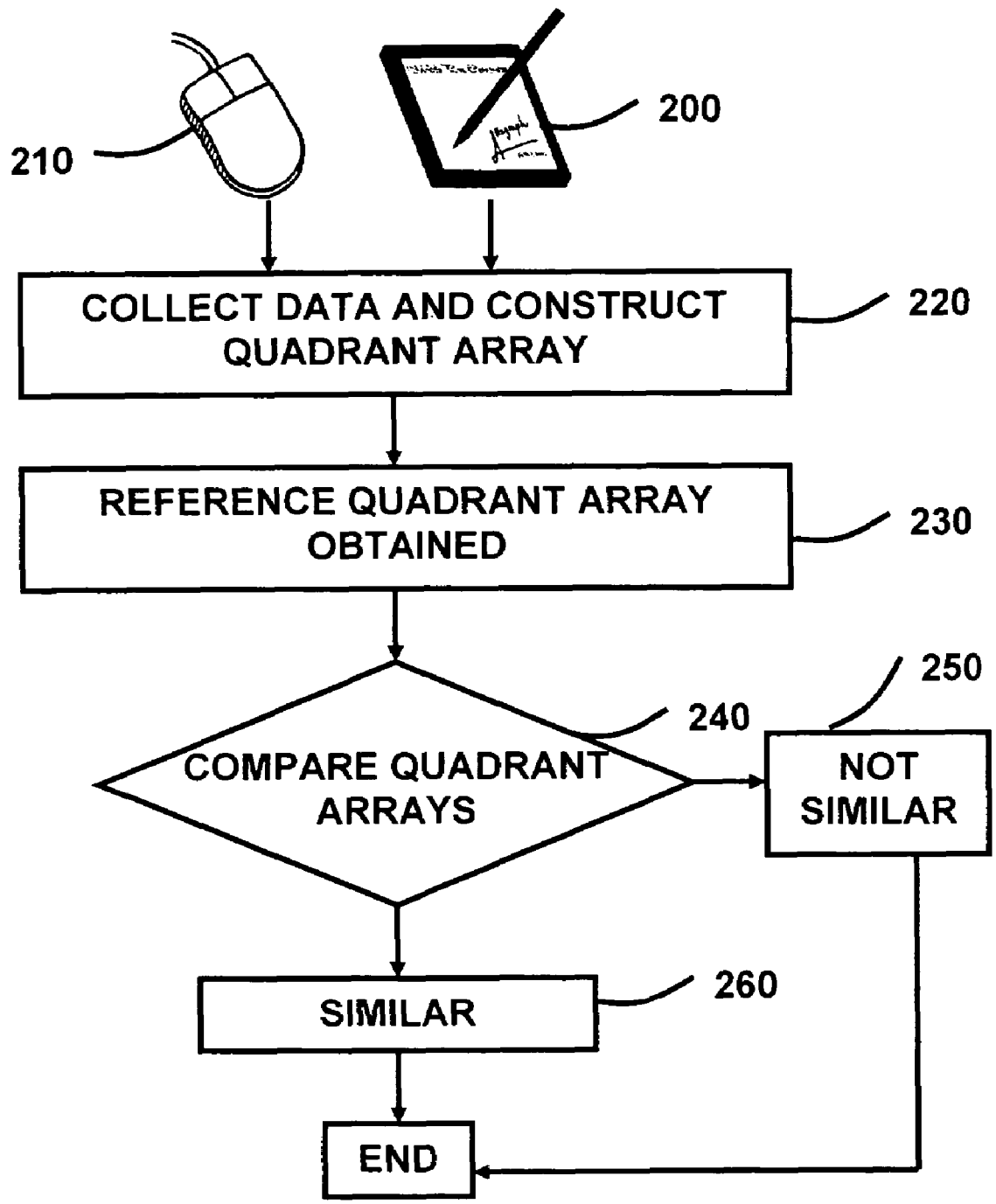
FIG. 2 is a flow chart illustrating a potential application of the invention.

FIG. 2 is a flow chart illustrating a potential application of the invention. Initially, an individual generates a line by using the computer mouse 210 or a digitizer tablet 200, creating data for processing. This data is then used to construct the quadrant array (step 220). At step 230, a reference quadrant array is obtained from computer storage. The constructed quadrant array is compared to a reference quadrant array for similarities. At this point, the lines are either similar (step 260) or not similar (step 250) based on the number of matching quadrants and the closeness between sizes of the two quadrant arrays.

Figure 3:
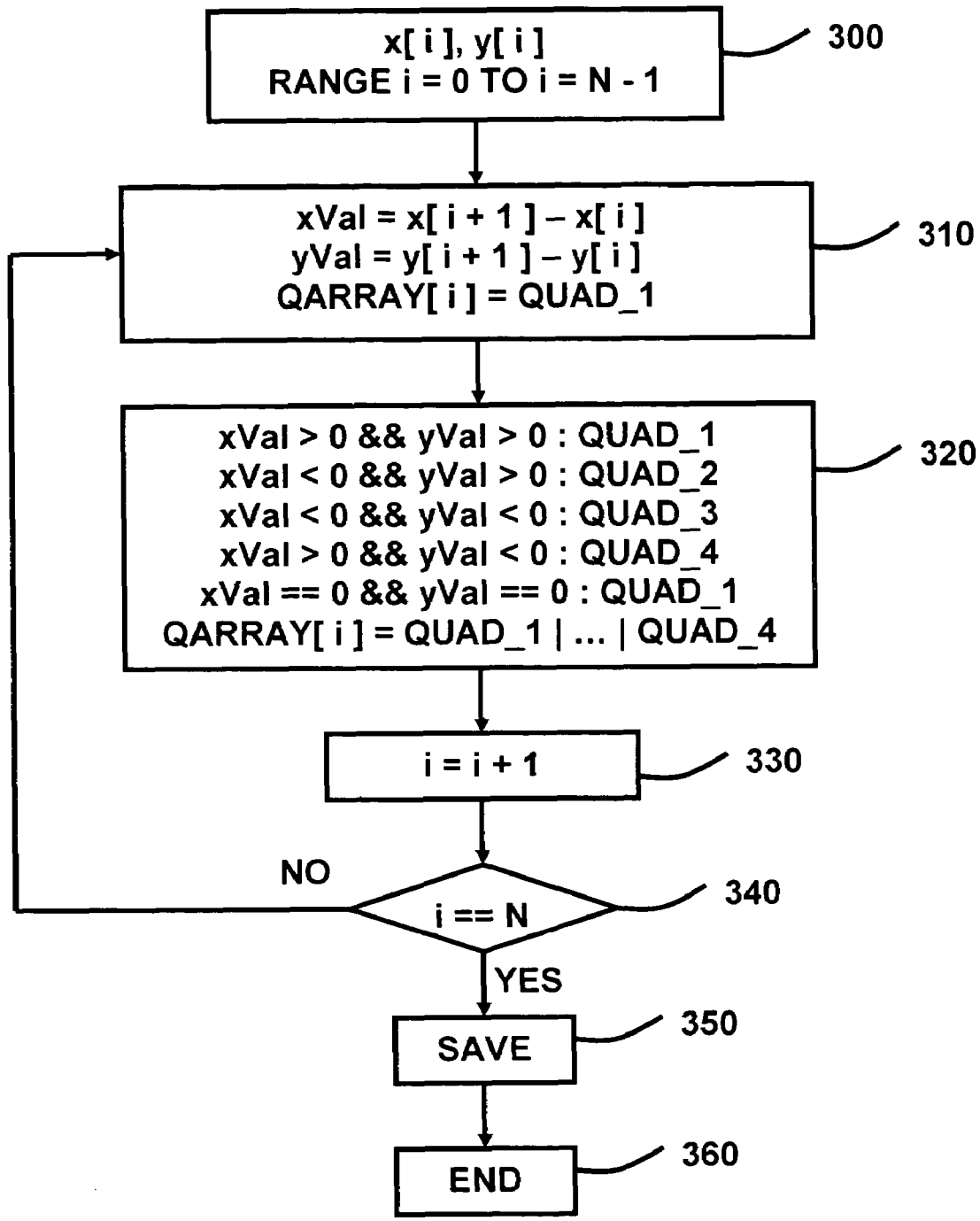
FIG. 3 illustrates a specific embodiment of the invention.

FIG. 3 illustrates a specific embodiment of the invention. The series of x, y coordinate values generated by the movement of a computer mouse or a digitizer tablet is represented as an array of x[i] and an array of y[i] with i varying from i equal to 0 to i equal to the number of data points minus 1 (N−1) (step 300).

The xVal and yVal values for determining the quadrant array element is created by determining the difference between two consecutive x, y coordinate values, with x[i+1] and x[i] are two consecutive x values and y[i+1] and y[i] are two consecutive y values (step 310). The QARRAY[i] represents the quadrant array and each quadrant array element is initially set to QUAD_1, QUAD_1 is an integer defined by the programmer (step 310). Once the xVal and yVal are created, QARRAY[i] is then set to the appropriate quadrant, QUAD_1, QUAD_2, QUAD_3, or QUAD_4 (step 320). QUAD_1, QUAD_2, QUAD_3, and QUAD_4 are integers defined by the programmer. i is then incremented by one step (step 330) and a determination is made as to whether or not all data points have been used (step 340). If all the data points have been used to construct the quadrant array, the program then saves the quadrant array in computer storage (step 350) and the program ends (step 360); otherwise the program loops back to step 310 to build the next quadrant array element.

Figure 4:
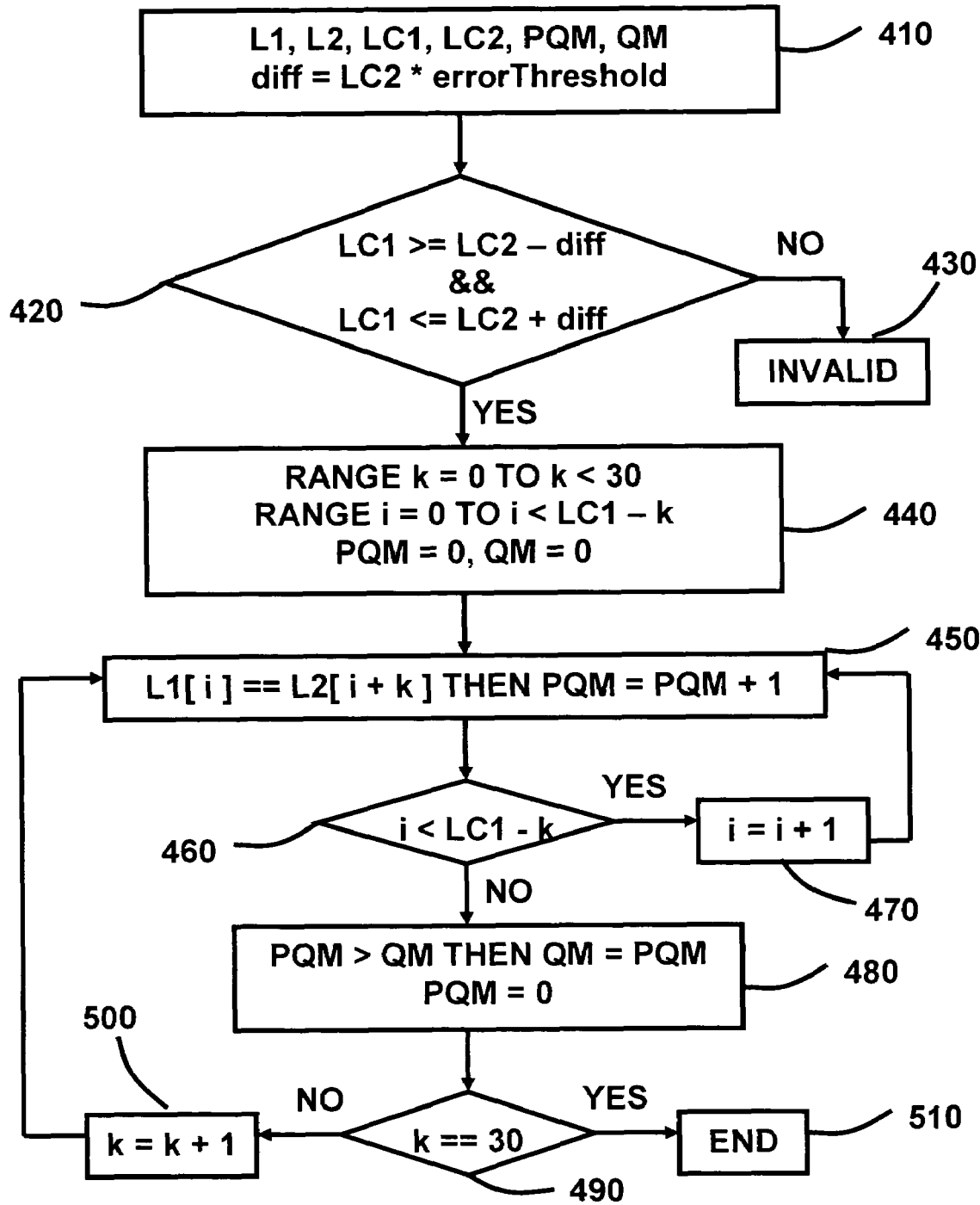
FIG. 4 illustrates a second embodiment of the invention.

FIG. 4 illustrates a second embodiment of the invention. L1 and L2 represents two quadrant arrays (step 410). LC1 represents the smallest quadrant array size of the two quadrant arrays, L1 and L2 (step 410). LC2 represents the largest quadrant array size of the two quadrant arrays, L1 and L2 (step 410). PQM is the previous number of quadrant matches and QM is the number of quadrant matches (step 410). diff is the errorThreshold multiply by LC2 (step 410). The errorThreshold is the decimal percentage of acceptance, ranging from 0 to 1 (step 410).

After the program has calculated the diff and sets LC1 and LC2 (step 410), the program then determines if the line with the smallest quadrant array size falls within a specific range (step 420). For example, LC1 is 17, LC2 is 20, and errorThreshold is 0.1. Therefore, diff is equal to 2 because 20*0.1=2. If LC1 is greater than or equal to LC2−diff and LC1 is less than or equal to LC2+diff, then the two lines have passed the quadrant array size closeness test. In the example, L1 and L2 would not pass the quadrant array size closeness test because LC1=17 does not fall within the 18 to 22 range, inclusive.

If LC1 is less than LC2−diff or LC1 is greater than LC2+diff, the program ends with an invalid response (step 430). If LC1 is greater than or equal to LC2−diff and LC1 is less than or equal to LC2+diff, the program continues to step 440.

At step 440, the program sets PQM to 0 and QM to 0. The program then continues to step 450. At step 450, the program compares if L1[i] and L2[i+k] are equal; if they are equal, then PQM is incremented by one (step 450). At this point, the program then checks if i is less than LC1−k (step 460). If i is less than LC1−k, then i is incremented by one (step 470) and the program loops back to step 450. If i is not less than LC1−k, then the program continues to step 480. At step 480, the program checks if PQM is greater than QM. If so, QM is set to PQM (step 480). PQM is then set to 0 (step 480). At this point, the program checks to see if k is equal to 30 (step 490). If k is equal to 30, the program ends (step 510). If k is not equal to 30, then k is incremented by one (step 500) and loops back to step 450.

This invention has now been explained with reference to specific embodiments. Other embodiments will be apparent to those of ordinary skill in the art in light of this disclosure. It is therefore not intended that this invention be limited except as indicated by the appended claims.

What is claimed is:

1. A method for creating an array of quadrants using a computer, the computer
  comprising a processor, a memory, and either a computer mouse or a digitizer tablet, the method comprising:
    capturing a series of x, y coordinate values generated by either a computer mouse or a digitizer tablet and using consecutive points to create an quadrant array that can be stored in computer storage according to the following pseudo code:

```
for i = 0 to N − 1
    xVal = x[ i + 1 ] − x[ i ]
    yVal = y[ i + 1 ] − y[ i ]
    QARRAY[ i ] = QUAD_1
    if xVal > 0 && yVal > 0
        then QARRAY[ i ] = QUAD_1
    if xVal < 0 && yVal > 0
        then QARRAY[ i ] = QUAD_2
    if xVal < 0 && yVal < 0
        then QARRAY[ i ] = QUAD_3
    if xVal > 0 && yVal < 0
        then QARRAY[ i ] = QUAD_4
``` where
  x[i] and y[i] over the range i=0 to i=N−1 is the discrete representation of a line,
  QARRAY[i] over the range i=0 to i=N−2 is the quadrant array,
  QUAD_1, QUAD_2, QUAD_3, and QUAD_4 are integers, and
  xVal and yVal are integers, and
  N is the number of points.

2. A method for comparing two quadrant arrays comprising:
  calculating the difference between the quadrant array sizes according to the following relationships:

$diff = LC2 * \text{errorThreshold}$ $LC1 >= LC2 - \text{diff} \ \&\& \ LC1 <= LC2 + \text{diff}$ where
errorThreshold is a decimal number from 0 to 1 inclusive,
LC1 represents the smallest quadrant array size,
LC2 represents the largest quadrant array size, and
diff is the error difference calculated by taking LC2 multiply that by errorThreshold.

3. A method for comparing two quadrant arrays comprising:
calculating the number of matched quadrant elements of two quadrant arrays according to the following pseudo code:

```
PQM = 0
QM = 0
for k = 0 to k < 30
    for i = 0 to i < LC1 − k
        if L1 [ i ] == L2[ i + k ]
            increment PQM
        if i < LC1 − k
            break
    if PQM > QM
        then QM = PQM
    QM = 0
    If k == 30
        break
``` where
L1[i] and L2[i] are quadrant arrays,
PQM is the previous number of quadrant matches,
QM is the number of quadrant matches,
LC1 is the smallest number of points,
k ranges from 0 to 30 inclusive, and
i ranges from 0 to i<LC1−k.

4. A method for comparing a first continuous line to a second continuous line, comprising the steps of:
forming a first quadrant array from first data of said first continuous line;
forming a second quadrant array from second data of said second continuous line;
said first-quadrant array being formed from said first data at a first time and a second time;
said second quadrant array being formed from said second data at a third time and a fourth time, and
determining whether the first line and the second line are similar based upon a number of matched quadrant elements front the first quadrant array first data of said first continuous line and the second quadrant array from the second data of said second continuous line.

5. A method for comparing a first continuous line to a second continuous line as in claim 4, wherein the method includes the step of determining whether said first continuous line and said second continuous line are similar based upon a comparison of said first quadrant array and said second quadrant array.

6. A method for comparing a first continuous line to a second continuous line as in claim 4, wherein the method includes the step of adjusting a sampling interval to determine said first time and said second time.

7. A method for comparing a first continuous line to a second continuous line as in claim 4, wherein the method includes the step of determining quadrant array elements, from consecutive time intervals.

8. A method for comparing a first continuous line to a second continuous line as in claim 4, wherein the method includes the step of determining a largest array size from said first quadrant array and said second quadrant array.

9. A method for comparing a first continuous line to a second continuous line as in claim 8, wherein the method includes the step of determining a smallest array size from said first quadrant array and said second quadrant array.

10. A method for comparing a first continuous line to a second continuous line as in claim 9, wherein the method includes the step of determining if said largest array size and said small array size is within a predetermined range to determine a quadrant match.

11. A method for comparing a first continuous line to a second continuous line as in claim 10, wherein the method includes the step of determining the number of quadrant matches.

* * * * *